(12) United States Patent
Buscema (10) Patent No.: US 8,665,269 B2
(45) Date of Patent: Mar. 4, 2014

(54) METHOD OF DETERMINING FEATURES OF EVENTS OR PROCESSES HAVING A DYNAMIC EVOLUTION IN SPACE AND/OR TIME

(75) Inventor: Paolo Massimo Buscema, Rome (IT)

(73) Assignees: CSI Ricerca & Ambiente SRL, Rome (IT); Semeion Centro Ricerche, Rome (IT)

( * ) Notice: Subject to any disclaimer, the term of this patent is extended or adjusted under 35 U.S.C. 154(b) by 511 days.

(21) Appl. No.: 12/969,620

(22) Filed: Dec. 16, 2010

(65) Prior Publication Data

US 2012/0155715 A1    Jun. 21, 2012

(51) Int. Cl.
    *G06T 15/40*    (2011.01)
(52) U.S. Cl.
    USPC .......................................... 345/421; 345/424
(58) Field of Classification Search
    USPC .................................................. 345/421, 424
    See application file for complete search history.

(56) References Cited

U.S. PATENT DOCUMENTS

| | | | | |
|---|---|---|---|---|
| 6,246,964 B1 * | 6/2001 | Blaunstein | ....................... | 702/15 |
| 6,560,585 B1 * | 5/2003 | Le Goc et al. | ................... | 706/23 |
| 7,277,797 B1 * | 10/2007 | Kunitsyn et al. | ................ | 702/15 |

* cited by examiner

*Primary Examiner* — Maurice L McDowell, Jr.
(74) *Attorney, Agent, or Firm* — Themis Law

(57) ABSTRACT

A method of determining features of events or processes having a dynamic evolution in space and/or time using measurements of parameters that calculate the most probable consequences of the event or process at a certain time includes:
  defining a set of measurable parameters describing the effects of the event or process, characteristic of the event or process, and measurable at a certain time;
  defining a n-dimensional space where the parameters describing the event or process are represented by entity points;
  determining, as a function of the measured values of the characteristic parameters describing the event or process at the certain time, a geometrical point in the n-dimensional space forces accumulate that are generated by the evolution of the event of process in time; and
  displaying or printing the n-dimensional space where the characteristic parameters are shown as entity points and as a geometrical point.

15 Claims, 8 Drawing Sheets

The 3x3 grid

Harmonic Point and The Harmonic Map

| ID# | Name | X | Y | ID# | Name | X | Y |
|---|---|---|---|---|---|---|---|
| 1 | 3597-Greeley-07/22/2003 | 40.43618 | -104.680862 | 47 | 3643-Longmont-04/28/2004 | 40.168116 | -104.975564 |
| 2 | 3598-Erie-07/22/2003 | 40.04151 | -105.070339 | 48 | 3644-Longmont-04/28/2004 | 40.168116 | -104.975564 |
| 3 | 3599-Windsor-07/16/2003 | 40.474553 | -104.906879 | 49 | 3645-Longmont-04/28/2004 | 40.168116 | -104.975564 |
| 4 | 3600-Greeley-07/22/2003 | 40.420067 | -104.702369 | 50 | 3646-Longmont-04/28/2004 | 40.168116 | -104.975564 |
| 5 | 3601-Ault-07/24/2003 | 40.582409 | -104.732307 | 51 | 3647-Greeley-05/14/2004 | 40.409964 | -104.708009 |
| 6 | 3602-Dacono-07/23/2003 | 40.082286 | -104.926274 | 52 | 3648-Windsor-05/15/2004 | 40.460193 | -104.899636 |
| 7 | 3603-Erie-07/24/2003 | 40.011271 | -104.992257 | 53 | 3649-Fort_Lupton-06/01/2004 | 40.089076 | -104.813936 |
| 8 | 3604-Windsor-07/25/2003 | 40.472649 | -104.887398 | 54 | 3650-Fort_Lupton-06/01/2004 | 40.089076 | -104.813936 |
| 9 | 3605-Erie-07/25/2003 | 40.0485 | -105.047257 | 55 | 3651-Evans-06/01/2004 | 40.379657 | -104.70303 |
| 10 | 3606-Erie-07/25/2003 | 40.03836 | -105.041328 | 56 | 3652-Brighton-06/03/2004 | 40.011743 | -104.841405 |
| 11 | 3607-Windsor-07/25/2003 | 40.534943 | -104.934814 | 57 | 3653-Longmont-06/06/2004 | 40.183277 | -104.979408 |
| 12 | 3608-Longmont-07/26/2003 | 40.13214 | -104.941949 | 58 | 3654-Longmont-06/06/2004 | 40.183277 | -104.979408 |
| 13 | 3609-Kersey-07/27/2003 | 40.386085 | -104.564364 | 59 | 3655-Longmont-06/06/2004 | 40.183277 | -104.979408 |
| 14 | 3610-Greeley-07/27/2003 | 40.426548 | -104.752992 | 60 | 3656-Longmont-06/06/2004 | 40.183277 | -104.979408 |
| 15 | 3611-Longmont-07/27/2003 | 40.14563 | -104.914649 | 61 | 3657-Longmont-06/14/2004 | 40.161752 | -105.016678 |
| 16 | 3612-Greeley-07/27/2003 | 40.43016 | -104.720259 | 62 | 3658-Longmont-06/13/2004 | 40.161752 | -105.016678 |
| 17 | 3613-Greeley-07/28/2003 | 40.420067 | -104.702369 | 63 | 3659-Longmont-06/13/2004 | 40.161752 | -105.016678 |
| 18 | 3614-Firestone-07/28/2003 | 40.116852 | -104.938301 | 64 | 3660-Evans-06/16/2004 | 40.377353 | -104.712901 |
| 19 | 3615-Fort_Lupton-07/29/2003 | 40.090212 | -104.801898 | 65 | 3661-Greeley-06/16/2004 | 40.411412 | -104.772446 |
| 20 | 3616-Fort_Lupton-07/30/2003 | 40.080136 | -104.895584 | 66 | 3662-Windsor-06/13/2004 | 40.542424 | -104.923573 |
| 21 | 3617-Keenesburg-07/29/2003 | 40.107445 | -104.519854 | 67 | 3663-Eaton-06/20/2004 | 40.53028 | -104.713189 |
| 22 | 3618-Greeley-07/28/2003 | 40.439156 | -104.795461 | 68 | 3664-Fort_Lupton-06/20/2004 | 40.149673 | -104.848703 |
| 23 | 3619-Longmont-07/30/2003 | 40.189222 | -105.02433 | 69 | 3665-Frederick-06/29/2004 | 40.102854 | -104.935093 |
| 24 | 3620-Erie-07/30/2003 | 40.017179 | -105.096407 | 70 | 3666-Windsor-06/30/2004 | 40.461847 | -104.899322 |
| 25 | 3621-Longmont-07/30/2003 | 40.189458 | -105.028018 | 71 | 3667-Windsor-07/01/2004 | 40.460497 | -104.896534 |
| 26 | 3622-La_Salle-07/31/2003 | 40.273135 | -104.696469 | 72 | 3668-Greeley-07/02/2004 | 40.388221 | -104.783103 |
| 27 | 3623-Longmont-07/31/2003 | 40.16394 | -105.100504 | 73 | 3669-Dacono-07/05/2004 | 40.083378 | -104.930278 |
| 28 | 3624-Greeley-07/30/2003 | 40.360613 | -104.750685 | 74 | 3670-Dacono-07/05/2004 | 40.083378 | -104.930278 |
| 29 | 3625-Greeley-07/31/2003 | 40.42107 | -104.698525 | 75 | 3671-Dacono-07/05/2004 | 40.083378 | -104.930278 |
| 30 | 3626-Keenesburg-08/04/2003 | 40.093638 | -104.58453 | 76 | 3672-Greeley-07/04/2004 | 40.390296 | -104.772431 |
| 31 | 3627-Windsor-08/01/2003 | 40.474553 | -104.906879 | 77 | 3673-Eaton-07/07/2004 | 40.525609 | -104.722431 |
| 32 | 3628-Windsor-08/03/2003 | 40.460662 | -104.892109 | 78 | 3674-Greeley-07/08/2004 | 40.418217 | -104.740956 |
| 33 | 3629-Frederick-08/05/2003 | 40.106834 | -104.928865 | 79 | 3675-Fort_Lupton-07/10/2004 | 40.091524 | -104.807118 |
| 34 | 3630-Longmont-08/07/2003 | 40.142327 | -104.921588 | 80 | 3676-Fort_Lupton-07/10/2004 | 40.091524 | -104.807118 |
| 35 | 3631-Frederick-08/09/2003 | 40.101909 | -104.932565 | 81 | 3677-Greeley-07/14/2004 | 40.421173 | -104.734275 |
| 36 | 3632-Erie-08/11/2003 | 40.038381 | -105.041502 | 82 | 3678-Greeley-07/14/2004 | 40.421173 | -104.734275 |
| 37 | 3633-Dacono-08/12/2003 | 40.07949 | -104.942336 | 83 | 3679-Windsor-07/14/2004 | 40.468719 | -104.908737 |
| 38 | 3634-Greeley-08/13/2003 | 40.417232 | -104.687709 | 84 | 3680-Greeley-07/17/2004 | 40.431738 | -104.746633 |
| 39 | 3635-Johnstown-08/13/2003 | 40.342256 | -104.753229 | 85 | 3681-Brighton-07/16/2004 | 40.004304 | -104.719294 |
| 40 | 3636-Windsor-08/19/2003 | 40.472649 | -104.887398 | 86 | 3682-Hudson-07/27/2004 | 40.089706 | -104.612994 |
| 41 | 3637-Mead-08/20/2003 | 40.24117 | -104.994219 | 87 | 3683-Erie-07/31/2004 | 40.072639 | -105.032413 |
| 42 | 3638-Johnstown-08/21/2003 | 40.331282 | -104.913068 | 88 | 3684-Hudson-08/06/2004 | 40.068827 | -104.640689 |
| 43 | 3639-Greeley-08/21/2003 | 40.055191 | -105.059814 | 89 | 3685-Ault-08/07/2004 | 40.56691 | -104.73699 |
| 44 | 3640-Greeley-08/19/2003 | 40.400764 | -104.753229 | 90 | 3686-Fort_Lupton-08/20/2004 | 40.084304 | -104.813114 |
| 45 | 3641-Erie-09/03/2003 | 40.032984 | -105.078538 | 91 | 3687-Windsor-08/27/2004 | 40.519746 | -104.867032 |
| 46 | 3642-Firestone-03/19/2004 | 40.114109 | -104.941978 | 92 | 3688-Evans-09/02/2004 | 40.37409 | -104.683459 |

METHOD OF DETERMINING FEATURES OF EVENTS OR PROCESSES HAVING A DYNAMIC EVOLUTION IN SPACE AND/OR TIME

FIELD OF THE INVENTION

The invention relates to a method of determining features of events or processes having a dynamic evolution in space and/or time.

More particularly, the invention relates to a method of determining features of events or processes having a dynamic evolution in space and/or time, the event or process taking place in a space which can be described by a map, such as a two or three dimensional map, the behavior of the event or process being described by features or parameters which can be represented as points on the map.

An embodiment of the invention relates to a method of determining features of events or processes having a dynamic evolution in space and/or time, which can be represented by a topographic map or similar i.e. processes or events which take place in a geophysical territory, the territory being described by a two or three dimensional geometrical map.

The present invention is particularly relevant for evaluating complex events or processes relative to the consequences determined by the dynamical behavior of those events or processes.

BACKGROUND OF THE INVENTION

Events or processes are observed and described by effects, which can be described by measuring the values of certain physical or chemical parameters at a certain time and at certain locations in space. Generally the data acquired from these measurements is useful for determining the current condition of the evolutionary story of the event or process, but also for predicting what the future consequences will most probably be starting from the measured data. The consequences will also be effects, which can be described by measured values of physical and/or chemical parameters.

Giving an answer to the above problem is relevant for enhancing the cognitive capacities of devices having a certain artificial intelligence. Indeed, the most challenging technical problem of artificial intelligence is providing means that allow a device having artificial intelligence to evaluate measured data for determining most probable consequences, and thus taking decisions on how to react to the measured data. This problem is simple until the relationship between the measured data and the space/time evolution of an event or process can be expressed with exact equations. Human intelligence however is provided with a skill which allows extracting probable consequences from data apparently not clearly related one to the other. The way of determining these consequences is highly non linear and non deterministic, so it is not a direct way to implement or try and simulate such skills in a device even if at a very primitive level.

Many events or processes can be described by a map, in which characteristic data are represented by points in the map, and in which the data relate to the measured values of physical and or chemical parameters univocally describing the status at a certain time at which the measurement has been carried out.

During the evolution of the event or process the parameter changes, and since no clear relationship can be determined between the single parameters, it is not evident what consequences such changes will have in the future.

SUMMARY OF THE INVENTION

An object of the present invention is providing a method for determining features of events or processes having a dynamic evolution in space and/or time, which can calculate the most probable consequences of the event or process at a certain time using measurements of values of parameters describing a process.

The method of determining features of events or processes having a dynamic evolution in space and/or time according to the present invention includes the following steps:

defining a set of parameters describing the effects of the event or process which can be measured and are characteristic of such event or process, the values of those parameters being measured;

defining a n-dimensional space in which the parameters describing the event or process are represented by points defined as entity points;

determining, as a function of the measured values of the characteristic parameters describing the event or process, a geometrical point in the n-dimensional space, the geometrical point being the point of accumulation of forces generated by the evolution of the event of process in time; and displaying or printing the n-dimensional space in which the characteristic parameters are shown as entity points as well as the geometrical point.

That geometrical point is the point at which the probability is highest that additional effects will occur that are generated by the event or process as a consequence of the development of the event or process described by the measured values of the parameters.

In one embodiment, the determination of that geometrical point is carried out according to the following steps:

defining a n-dimensional array of points in the n-dimensional space, and determining the geometrical point as the geometrical points for which there is a minimum of the sum of the rests of the divisions of the distance of each point of the grid with the distances that each geometric point has from each of the entity points.

An application of the present method is in a three or in a two dimensional space.

In this application, the space can be divided in voxels or pixels respectively for a three or for a two dimensional space.

The above method can be very simply adapted to events which can be described by images or maps and in particular to events or processes which are described in a geographical space.

For a two dimensional application the above method computes the coordinates of the geometrical point called Harmonic Center, which is the geometrical point having distances from the points that represent measured parameters at a certain time, so called assigned Entities, that minimize the sum of the remainders of their reciprocal divisions.

In a two dimensional space represented as an array of pixels, the following equations describes the harmonic point:

$$d_{k,j}[C \cdot (1 + (x_k - x_i)^2 + (y_k - y_i)^2)]$$

$$dH_k = 1.0 - f\left(\frac{\sum_{i=1}^{N}\sum_{j=1,j\neq i}^{N} Rem(d_{k,i}, d_{k,j})}{\frac{1}{M} \cdot \sum_{k=1}^{M}\sum_{i=1}^{N}\sum_{j=1,j\neq i}^{N} Rem(d_{k,i}, d_{k,j})}\right)$$

$$dHarmonic = \arg\max_{k, k \in A \cup P} \{dH_k\}$$

where:

N=Number of points relating to measured parameters, also called entity points;

M=Number of pixel points i.e. the points of the array of points;

A=set of assigned points;
P=set of pixel points;
i, j∈{1, 2, ..., N};
k∈{1, 2, ..., M}
C=big integer positive constant;
D=Euclidean distance;
dH=harmonic distance;
f( )=linear scaling between [0,1];
dHarmonic=harmonic center or the geometrical point determined by the present method.

The above equation can be interpreted also as a geometrical point of maximum resonance of the effects of the event or process starting from the points in a photograph, which are defined as the entity points or the points representing measured parameters.

In an additional step, the entire space can be transformed into a Harmonic scalar field, where each geometrical point presents a specific Harmonic value.

At this point, according to a further improvement, a segmentation of the entire space into a certain number of classes with different degree of Harmony in relation with the assigned Entities can be carried out. The segmented harmonic scalar field can be represented by a two dimensional image, in which the geometric points that are of the same class are indicated by means of an identical color or shade of a color different from the other colors or shades used for representing the pixels assigned to the other classes.

This representation can provide a clear indication of where the effects of an event or process will concentrate their forces and so where these forces are accumulated and an unexpected effect is produced or will most probably produced in future times.

The Harmonic field segmentation is carried out according to the following equations starting from the above equations defining the harmonic center:

$$\overline{dH_M} = \frac{1}{M} \cdot \sum_{k=1, k \in P}^{M} dH_k$$

$$\overline{dH_N} = \frac{1}{N} \cdot \sum_{k=1, k \in P}^{N} dH_k$$

$$dH_{MAX_N} = \max_{k, x_k \in A} \{dH_k\}$$

$$dH_k \in H_{Max} \quad dH_k > H_{Max}$$

$$dH_k \in H_{High} \quad \overline{dH_N} < dH_k \leq H_{Max}$$

$$dH_k \in H_{Low} \quad \overline{dH_M} < dH_k \leq \overline{dH_N}$$

$$dH_k \in H_{Null} \quad dH_k \leq \overline{dH_M}$$

where, further to the above definitions, the following definitions are valid:

$\overline{dH_N}$ is the harmonic distance mean of the entity points (assigned points);

$\overline{dH_M}$ is the harmonic distance mean of the Pixel points, i.e. the points of the array of points;

$dH_{MAX_N}$ is the Minimal harmonic distance among the entity points (assigned points);

$H_{Max}$ is the set of points with maximum harmony;
$H_{High}$ is the set of points with high harmony;
$H_{Low}$ is the set of points with low harmony;
$H_{Null}$ is the set of points with Null harmony;

In this set of equations the segmentation of the scalar harmonic field has been carried out considering four different level or classes which are defined mathematically above.

It has to be stressed that the present method not only allows letting unknown features appear but also might evaluate the reliability of features which had been determined in other ways.

Moreover, it is to be stressed out that time may be one of the measured parameters and thus one of the dimensions of the two, three or n-dimensional space from which the map is constructed.

BRIEF DESCRIPTION OF THE DRAWINGS

Exemplary embodiments of the above invention will be described with the help of the enclosed figures, in which:

FIG. 3 is the table of cases related to the propagation of the west Nile Virus in Weld County;

DETAILED DESCRIPTION OF EMBODIMENTS OF THE INVENTION

Events or processes but also devices, plants or control systems can be described by physical and/or chemical parameters. Those parameters relate to the condition of the event, of the process or of the device, of the plant or the control system and/or to the functional or evolution steps which are carried out as a response to certain status conditions. Thus, it is clear that a space can be constructed representing the event, the process or the device, the plant, the control system in relation to certain status or functional parameters. Said status or functional behavior or the evolution of the event or the process can be so described by means of a topographic representation.

Similarly, a device or a plant or a control system can have a two or three dimensional structure, which can be described by functional or constructive schemes where single operative units or organs are represented and their connections, so that the behavior of the system, of the device or of the plant can be represented by the changes in the status or functional parameters of the single operative units or organs. That plant, that device or system already has a topographic structure related to the positions of the operative units, which could serve as a space for representing the system. In one embodiment, however, the space to be used is a space defined by a certain number of status or functional parameters of a certain number of operative organs or units, wherein a point in this space represents a status condition or a functional condition at a certain time of a certain operative unit or organ. When the status or functional conditions change in time, the point representing the status and/or functional condition of a certain operative unit or organ changes its place in the space.

Consider, for example, a system in which the status condition of each organ or unit provided in the system is defined by P, V and T (Pressure, Volume, Temperature) parameters. A three dimensional space can be constructed in which the status or functional condition of each unit or organ is described by a point in that space, the coordinate of the point being the measured or imposed values for pressure, volume and temperature at the unit or organ. Thus, representing each operative unit or organ by a different point positioned in the space according to the coordinate set equal to the measured or imposed values for pressure, volume and temperature at the unit or organ, a status map at a certain time of the entire system can be generated. Repeating said measures in time enables following status evolution.

If the system has a great number of operative organs or units, it is a very high burden to measure the values of pressure, volume and temperature at each of said operative organs or units.

Figure 1:
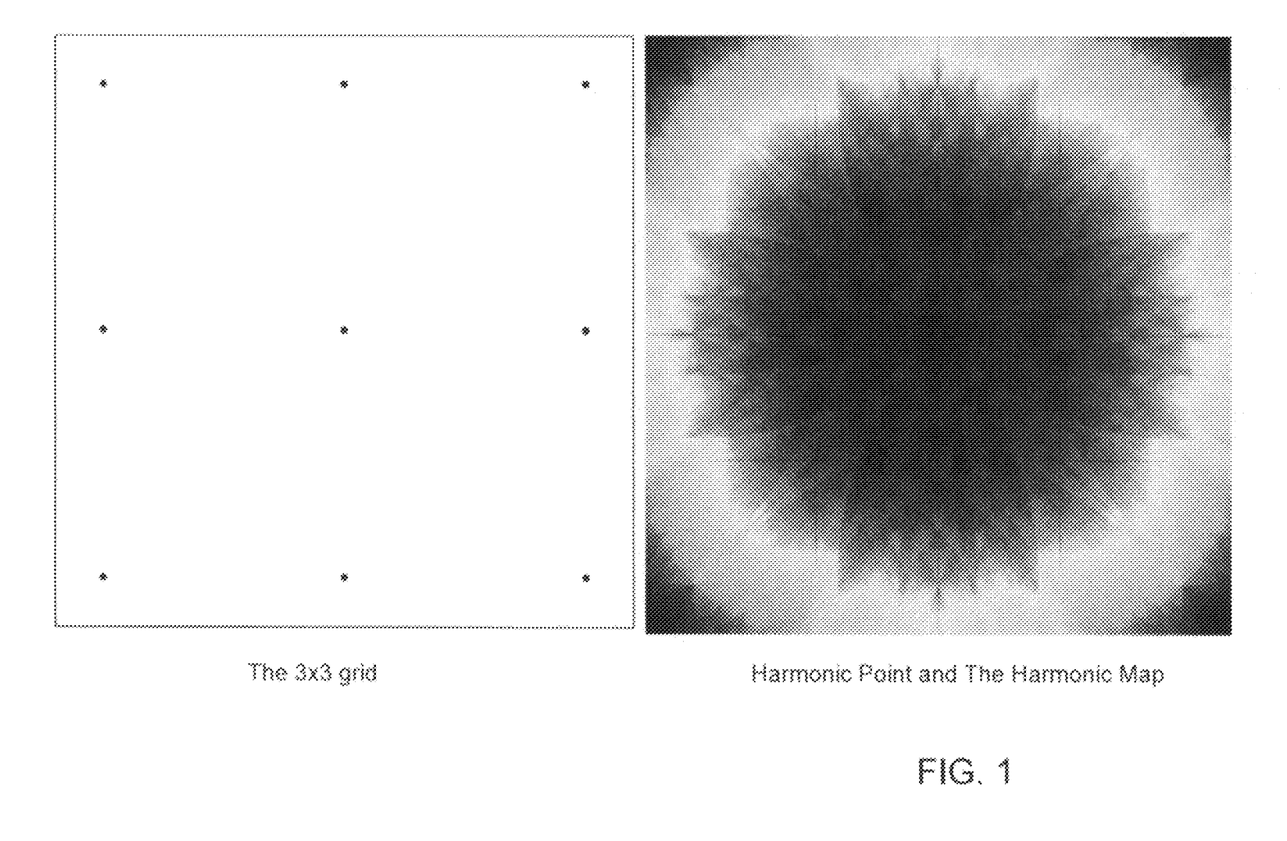
FIG. 1 illustrates the determination of the harmonic map of a 3×3 array of points or grid. On the left side of the figure the grid is illustrated, while on the right side the harmonic point and the map of the harmonic scalar field are illustrated using a polychromatic color scale for indicating the areas having identical harmony levels.

The example of FIG. 1 relates to the determination of the geometric point of a grid of points having a 3×3 dimension, the geometric point being the harmonic center of that image.

On the left side of FIG. 1 the 3×3 array of points coinciding with the crossing points of the lines of the grid are shown in a two dimensional space. On the right side the harmonic field determined by means of the above disclosed equations is illustrated.

Figure 2:
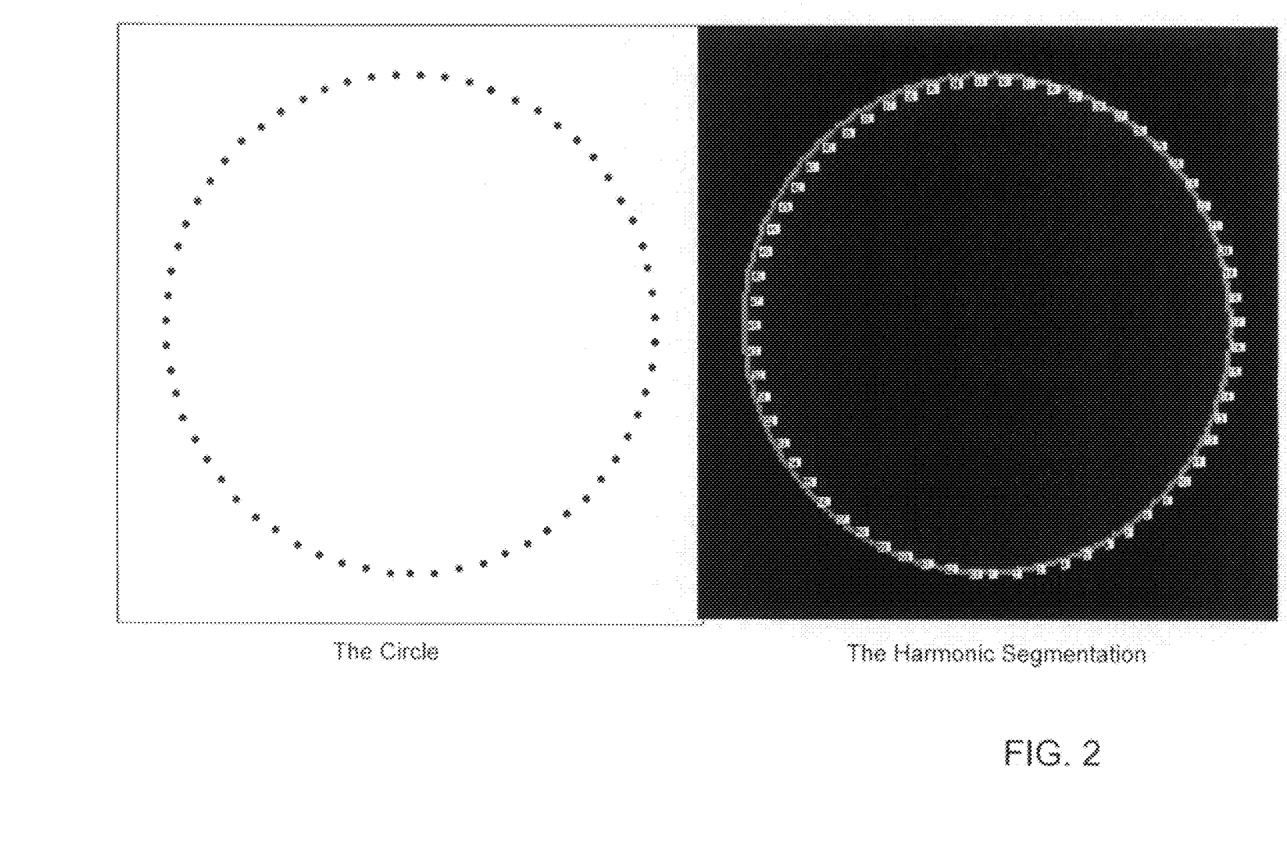
FIG. 2 is an example, in which on the left side a two dimensional space is shown in which a certain number of entity points or assigned points are represented. Those points are placed on a circular path. On the right side a segmented harmonic scalar field is represented determined as a function of the entity points on the right side.

In FIG. 2 the example of a circle is used. The entity points or parameters are the points on the circumference of a circle in the left side image. The points on the circumference are the assigned points or entity points and in a practical example those would correspond to points representing in a two dimensional space the measured value of certain characteristic parameters.

The right image represents the results of the harmonic field segmentation.

The segmentation is carried out according to the equations disclosed above in which the harmonic scalar field, i.e. the degree of harmony is divided in four classes.

The left side of FIG. 2 clearly indicates the maximum degree of harmony in a region inside the circle defined 63 points. Here the degree of harmony is greater than the maximum harmony of the entity points.

The inner circular line defines points where degree of harmony is greater than the mean degree of harmony of the entity points but lower than the maximum degree of harmony of the entity points.

The outer circular line relates to points where degree of harmony is greater than the harmony of all the geometric points, i.e. of all the points of the array of points or grid, but lower than the mean degree of harmony of the entity points. For these points the degree of harmony is null or very low.

So, if one considers an event or process which has characteristic parameters measured which, if plotted in a two dimensional space as points in this space, are placed along a circular paths as in FIG. 2 left side, the right side harmonic field segmentation clearly indicates that the maximum forces due to the process or events are generated and accumulated in a region of such two dimensional space, that is, inside the circle. Here, the effects of the process or event will show most probably or have been generated most probably. In the other zones of the two dimensional space the accumulation of the forces generated by the event or process is decreasing and the corresponding regions will not be probable effects of said process or event.

The interpretation of such a generic example is obviously related to the kind of a certain specific event or process in a certain specific physical environment.

A more practical example is illustrated by means of FIGS. 3 to 7 and relates to the propagation of the west Nile Virus in Weld County.

The table of FIG. 3 indicates the order number, the number of birds being found infected, the name of the place, and the date and the geographical coordinates of the place where the dead birds had been found.

Figure 4:
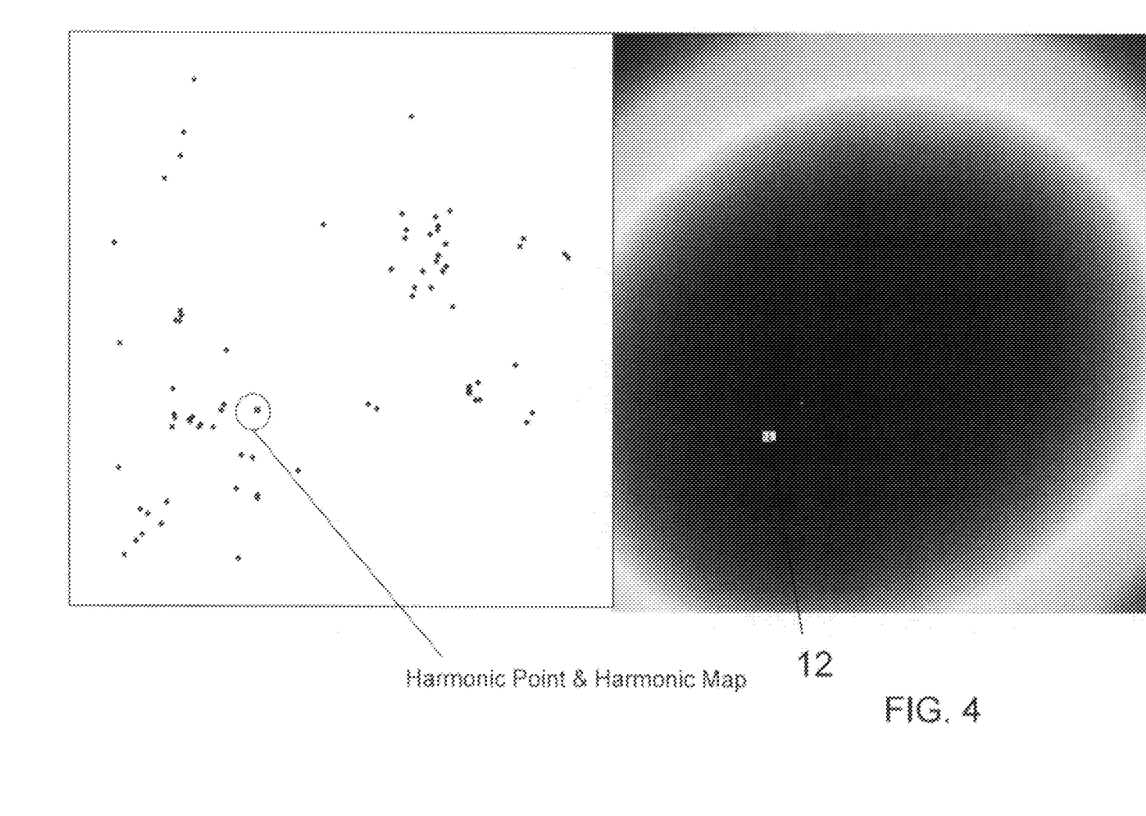
FIG. 4 illustrates, on the left side, the two dimensional map of entity or assigned points which has been taken from the table of FIG. 3, while, on the right side, the harmonic field and the harmonic point are shown, which are also shown on the left side map.

On the left side of FIG. 4, the map (two dimensional) is illustrated on which the locations where the infected birds have been found are represented by points placed in the two dimensional space according to their geographic coordinates.

The Geometric point is determined as the harmonic center according to the above disclosed equations and is highlighted by a circle.

This point represents the most probable place where dead birds also will be found or in which the event or process has particular consequences.

On the right side, the Harmonic map is illustrated by setting a polychromatic scale or in this case a grey scale equal to a harmonic degree scale, such that points of the array of points or pixels, in which the image, i.e. the two dimensional space is subdivided, that have an equal degree of harmony will be displayed as having the same color of the polychromatic scale or the same shade of grey.

Figure 5:
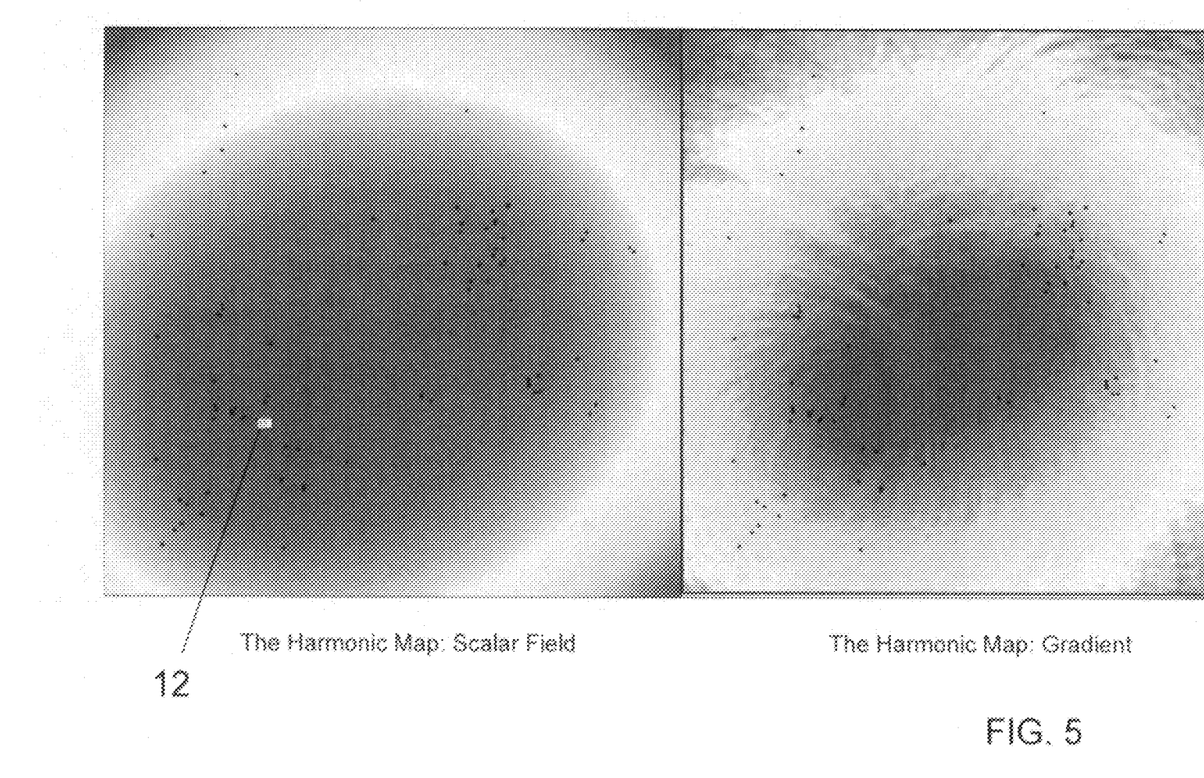
FIG. 5 illustrates the image of the harmonic scalar field and of the gradient of said scalar field respectively on the left and on the right side.

In FIG. 5 the map of the harmonic scalar field and the harmonic map of the gradient of the harmonic scalar field are illustrated. The images representing that scalar field and the gradient of that scalar field are also generated by relating a grey scale or a polychromatic scale to a scale of degrees of harmony. Here harmony is the value obtained for the different points of the array or grid, and in this case of pixels of an image calculated by means of the equations disclosed above.

The maps of the scalar field and of the gradient of the scalar field are overlapped to the map of FIG. 4, left side. The harmonic center coincides with point 12 of the map.

The distribution of the points and the degree of harmony coincides, since the locations where the birds have been found are inside the area indicated as having a high degree of harmony. The maximum intensity of the event is concentrated within an annular belt enclosing a center. The gradient of FIG. 4 right side indicates the rapidity with which the degree of harmony changes from a region to another. Within the region of maximum and high degree of harmony where the most locations are concentrated, the changes of the degree of harmony are not very high. The decrease of the degree of harmony is very steep with increasing distance starting from the belt of maximum degree of harmony.

Figure 6:
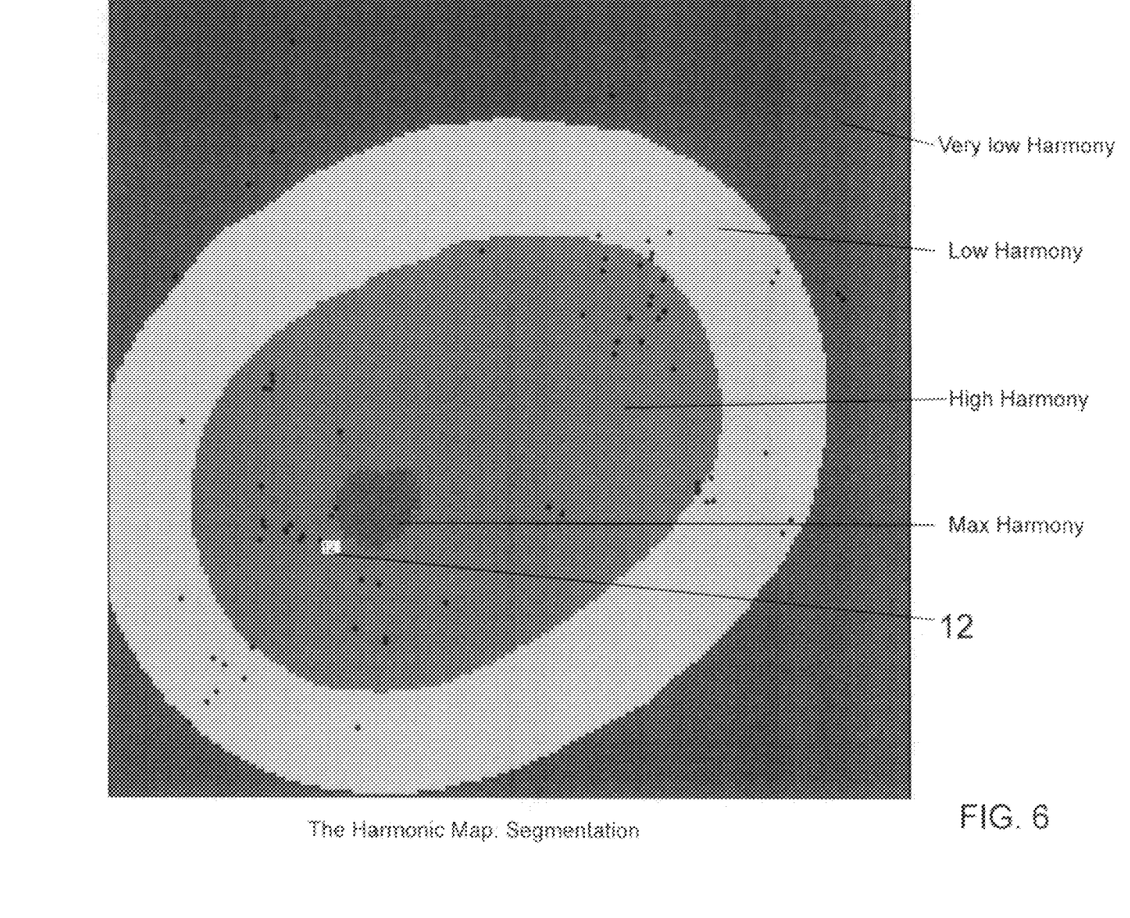
FIG. 6 illustrates the segmented harmonic scalar field.

FIG. 6 is a map similar to those of FIG. 5 but with a segmented scalar field according to the four classes defined in the above equations.

The map where the harmonic center 12 and the other locations are indicated as points is overlapped to the map of the segmented scalar field. Here the region of maximum degree of harmony is near the point 12. This region is within an ovoid region having a high degree of harmony, which is encircled by a belt of low degree of harmony while in the rest of the map the degree of harmony is very low.

As it appears clearly, the harmonic center and the harmonic field reveal a region where effects of the event were not searched but where most probably the event still had undiscovered effects or will have effects in future.

In the case of the present example, in the region with the highest degree of harmony, infected dead birds were also found in a considerable number.

Figure 7:
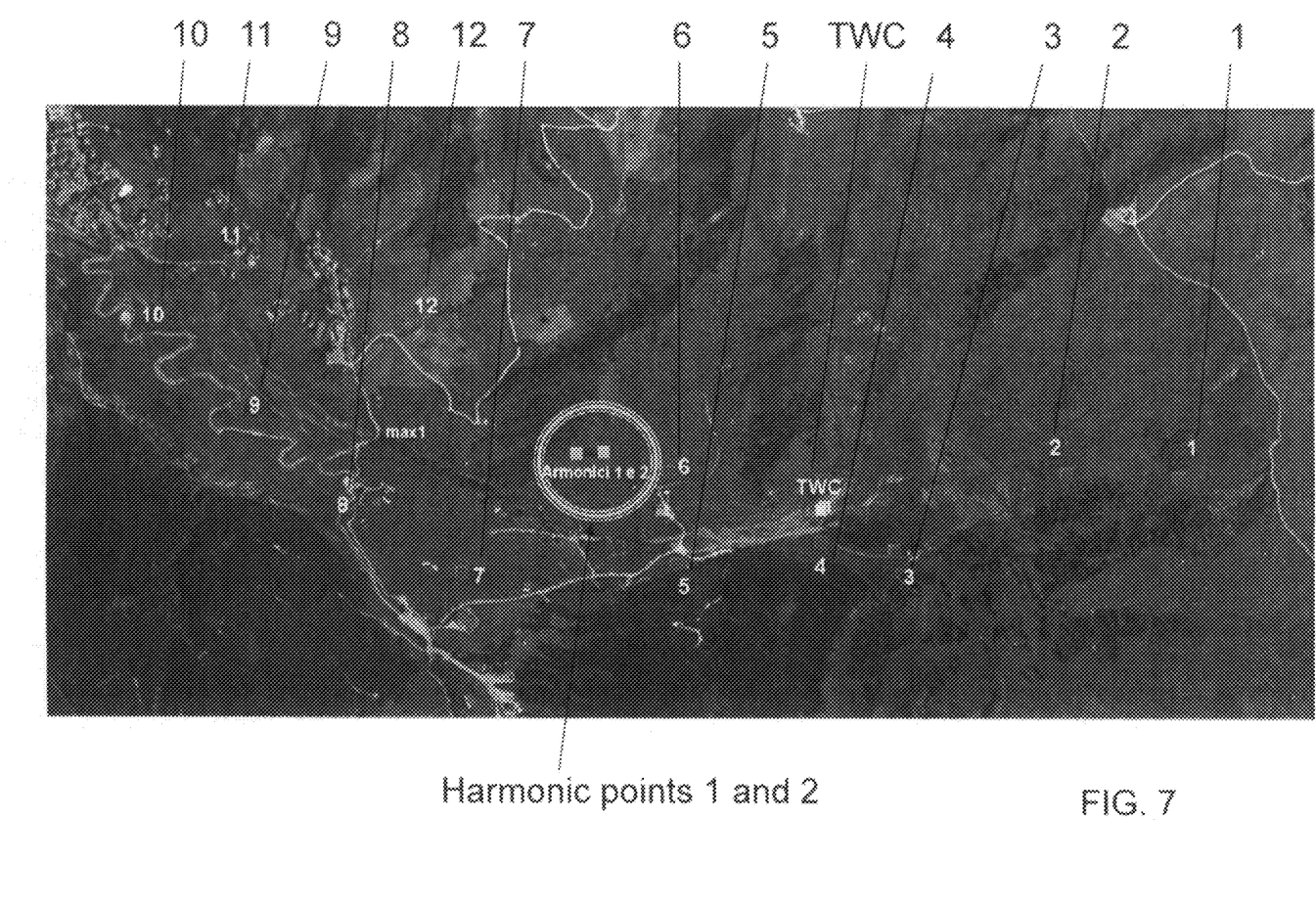
FIG. 7 illustrates a bird view picture of a region of the territory of Corvara where a landslide is monitored, and where the points 1 to 12 represent the monitored points on the map by means of GPS sensors. Harmonic points 1 and 2 are represented encircled.
Figure 8:
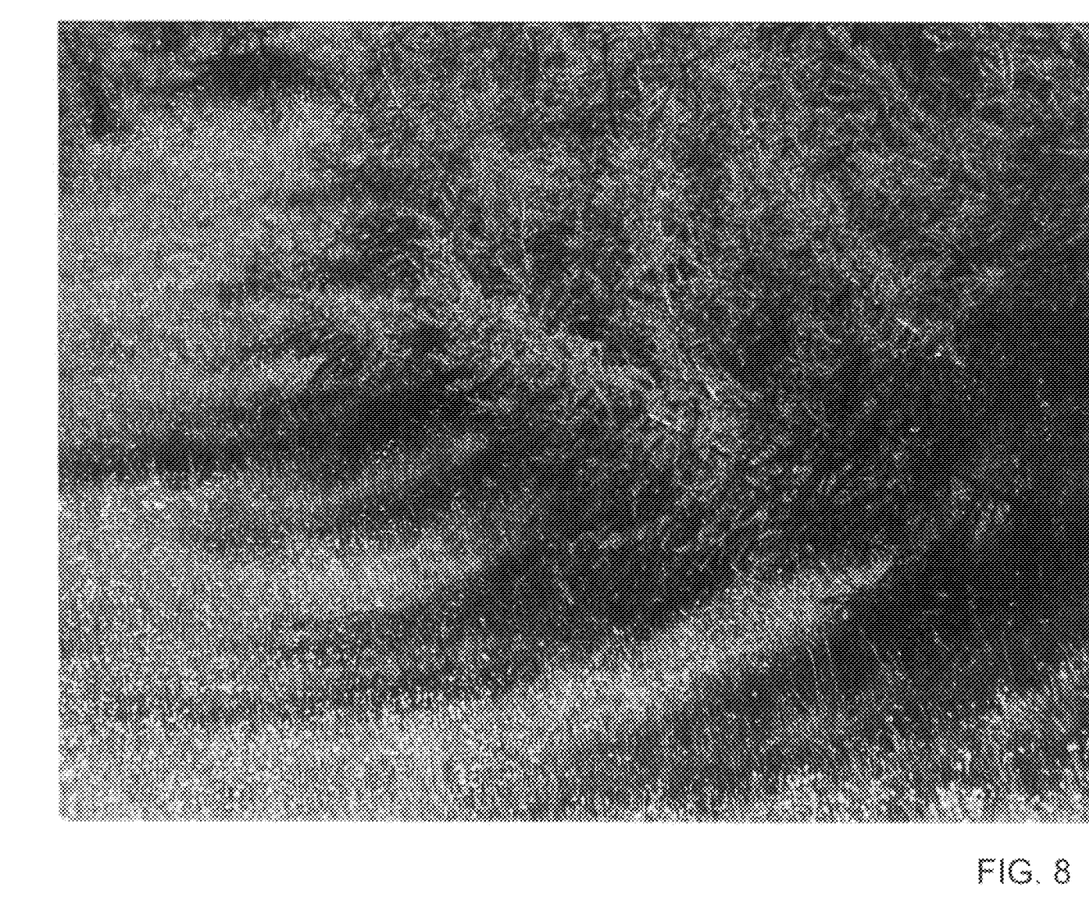
FIG. 8 is the picture of the inclined trees found on the territory at the harmonic points.

Another example is illustrated in FIGS. 7 and 8. In FIG. 7 there is shown a bird view picture of a region of the territory of the town of Corvara (Italy) where a landslide was being monitored. In that bird view, the points indicated by numerals 1 to 12 represents the monitored points by means of GPS sensors. The view further shows Harmonic points 1 and 2, which are represented encircled. The position of Harmonic points 1 and 2 on the map was determined with the present method. These two points were not monitored but they were determined using the method according to the present invention as points where effects of the landslide are also to be expected.

An inspection in the territory at those two points has revealed that the trees in that territory were inclined relative to the vertical direction as shown by the photograph of FIG. 8, thus demonstrating that the current method had correctly revealed an unknown feature of the process consisting in the landslide.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A method of determining features of events or processes having a dynamic evolution in one or more of space or time using measurements of values of parameters describing a process which calculates the most probable consequences of an event or process at a certain time, the method comprising the steps of:
    defining a set of parameters describing effects of the event or process which are measurable and characteristic of said event or process, values of said parameters being measured at a certain time;
    defining a n-dimensional space in which said parameters describing the event or process are represented by points defined as entity points;
    determining as a function of the measured values of the parameters describing the event or process at said certain time a geometrical point in said n-dimensional space, which geometrical point is a point of accumulation of forces generated by the evolution of the event or process in time; and
    displaying on a display device said n-dimensional space, in which said characteristic parameters are shown as entity points and said geometrical point is further shown.

2. The method of claim 1, wherein the event or process has a dynamic evolution in at least one of space or time, which event or process takes place in a space which is describable by a map, and the behavior of said event or process is described by features or parameters represented as points in said map.

3. The method of claim 2, wherein the event or process takes place in a geophysical territory, the territory being described by a two or three dimensional geometrical map.

4. The method of claim 1, wherein said geometrical point is the point at which probability is highest that there will occur further effects generated by said event or process as a consequence of development of the event or process described by said measured values of the parameters at the first and at least at a second time.

5. The method of claim 1, wherein the determination of said geometrical point is carried out according to the following steps:
    defining a n-dimensional array of points in said n-dimensional space; and
    determining the geometrical point as the geometrical point having a minimum in the sum of the rests of divisions of a distance of each point of a grid with distances that each geometric point has from each one of the entity points.

6. The method of claim 5, wherein the n-dimensional space is a two or three dimensional space and the n-dimensional array of points is a two or three dimensional array of points.

7. The method of claim 6, wherein the n-dimensional space is divided in voxels or pixels respectively for a three or for a two dimensional space, the n-dimensional array of points being an array of pixels or voxels.

8. The method of claim 7, wherein for a two dimensional application the coordinates of said geometrical point called Harmonic Center is determined as the geometrical point having distances from the points representing measured parameters at a certain time, so called assigned Entities, that minimize the sum of the remainders of their reciprocal divisions.

9. The method of claim 8, wherein in a two dimensional space represented as an array of pixels the following equations describes said—Harmonic Center:

$$d_{k,j} = \left[ C \cdot \left( 1 + \sqrt{(x_k - x_i)^2 + (y_k - y_i)^2} \right) \right]$$

$$dH_k = 1.0 - f\left( \frac{\sum_{i=1}^{N} \sum_{j=1, j\neq i}^{N} Rem(d_{k,i}, d_{k,j})}{\frac{1}{M} \cdot \sum_{k=1}^{M} \sum_{i=1}^{N} \sum_{j=1, j\neq i}^{N} Rem(d_{k,i}, d_{k,j})} \right)$$

$$dHarmonic = \arg\max_{k, k \in A \cup P} \{dH_k\}$$

where:
N=Number of points relating to measured parameters, also called entity points;
M=Number of pixel points i.e. the points of the array of points.
A=set of assigned points
P=set of pixel points
$i, j \in \{1, 2, \ldots, N\}$
$k \in \{1, 2, \ldots, M\}$
C=big integer positive constant;
D=Euclidean distance
dH=harmonic distance
f( )=linear scaling between [0,1]
dHarmonic=harmonic center or the geometrical point determined by the present method.

10. The method of claim 9, wherein the two dimensional space is transformed into a Harmonic scalar field, each geometrical point of said Harmonic scalar field presenting a specific Harmonic value.

11. The method of claim 10, wherein a segmentation of the two dimensional space into a certain number of classes with different degree of Harmony, in relation with the assigned Entities, is carried out.

12. The method of claim 11, wherein the Harmonic scalar field after said segmentation is represented by a two dimensional image in which the geometric points which are of the same class are indicated with an identical color or shade of a color, which is different from the other colors or shades used for representing the pixels assigned to the other classes.

13. The method of claim 11, wherein the segmentation is carried out according to the following equations:

$$\overline{dH_M} = \frac{1}{M} \cdot \sum_{k=1,k \in P}^{M} dH_k$$

$$\overline{dH_N} = \frac{1}{N} \cdot \sum_{k=1,k \in P}^{N} dH_k$$

$$dH_{MAX_N} = \max_{k, x_k \in A} \{dH_k\}$$

$$dH_k \in H_{Max} \; dH_k > H_{Max}$$

$$dH_k \in H_{High} \; \overline{dH_N} < dH_k \le H_{Max}$$

$$dH_k \in H_{Low} \; \overline{dH_M} < dH_k \le \overline{dH_N}$$

$$dH_k \in H_{Null} \; dH_k \le \overline{dH_M}$$

where in addition to the above definitions, the following definitions are valid:

$\overline{dH_N}$ is the harmonic distance mean of the entity points (assigned points);

$\overline{dH_M}$ is the harmonic distance mean of the Pixel points, i.e. the points of the array of points;

$dH_{MAX_N}$ is the Minimal harmonic distance among the entity points (assigned points);

$H_{Max}$ is the set of points with maximum harmony;

$H_{High}$ is the set of points with high harmony;

$H_{Low}$ is the set of points with low harmony;

$H_{Null}$ is the set of points with Null harmony;

and considering four different level or classes which are defined mathematically above.

14. The method of claim 1, wherein time is set equal to one of the dimensions of the space in which the process or event is represented as a map.

15. The method of claim 1, wherein the method is used for verifying reliability of possible features of a process or event which have been determined in a different way.

* * * * *